No. 642,981. Patented Feb. 6, 1900.
W. B. HANKINS.
LATHE DOG.
(Application filed May 24, 1899.)
(No Model.)
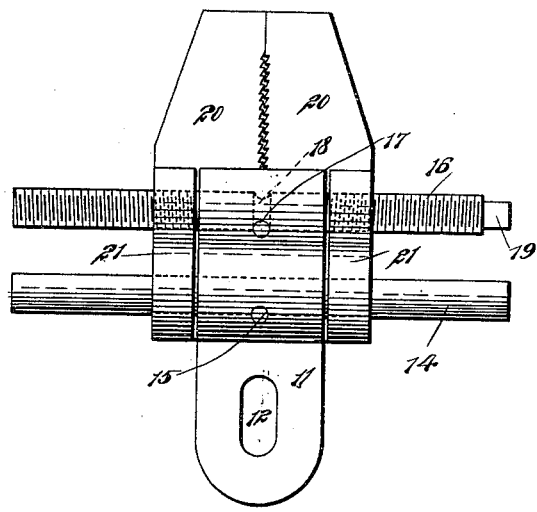
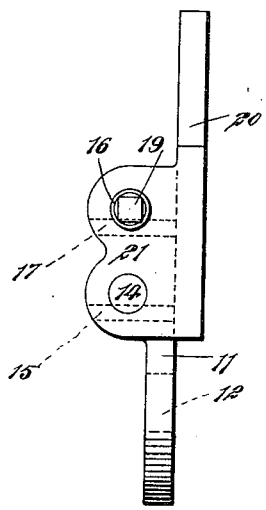
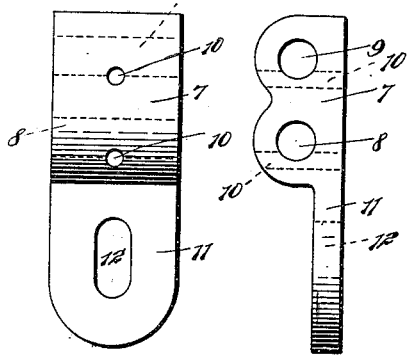
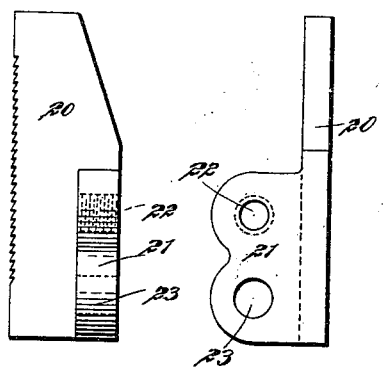
WITNESSES:
Chas. D. King
Isaac B. Owens
INVENTOR
W. B. Hankins
BY
Munn
ATTORNEYS
THE NORRIS PETERS CO., PHOTO-LITHO., WASHINGTON, D. C.

UNITED STATES PATENT OFFICE.

WILLIAM BENEDICK HANKINS, OF MOUNT VERNON, OHIO, ASSIGNOR OF ONE-HALF TO FRANK L. OSGOOD, OF SAME PLACE.

LATHE-DOG.

SPECIFICATION forming part of Letters Patent No. 642,981, dated February 6, 1900.

Application filed May 24, 1899. Serial No. 718,034. (No model.)

*To all whom it may concern:*

Be it known that I, WILLIAM BENEDICK HANKINS, of Mount Vernon, in the county of Knox and State of Ohio, have invented new and useful Improvements in Lathe-Dogs, of which the following is a full, clear, and exact description.

The purpose of this invention is to provide an adjustable lathe-dog which may be conveniently and effectively fitted to all kinds of work and which will not, therefore, necessitate changing the dog to suit the work.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a front elevation of the invention. Fig. 2 is a side elevation thereof. Fig. 3 is a detail front view of the stock or shank. Fig. 4 is a side view thereof. Fig. 5 is a detail face view of one of the jaws of the dog, and Fig. 6 is a side view of the same.

The shank or stock of the dog has a main or upper portion 7, formed with two transverse passages 8 and 9 therein, each of which is intersected by a keyway 10, which keyways are formed in the main portion at right angles to the passages 8 and 9. The shank also has a tail 11, with a slot 12 therein, by means of which slot the dog may be fastened to the face-plate of the lathe.

A guide-bar 14 is secured rigidly in the passage 8 of the shank by means of a pin 15, which is fitted into the keyway 10 adjacent to the passage 8. This guide-bar extends transversely beyond each side of the shank. In the passage 9 a right and left hand feed-screw 16 is mounted to turn, the screw being held from sliding by means of a key or pin 17, fitted in the keyway 10 adjacent to the passage 9 and engaging in an annular groove 18, formed in the screw 16. One end of the screw 16 is squared to form a head 19 to be engaged by a wrench or other tool for turning the screw.

The jaws of the dog are duplicates in construction, and consist each in a flat plate-like jaw proper, 20, having a serrated inner edge and having at its outer edge a lug or flange 21, in which is formed a screw-threaded passage 22 and a smooth passage 23. The jaws fit on the shank as shown in Figs. 1 and 2, the guide-bar 14 passing through the passages 23 and the screw 16 working in the passages 22, thus bringing the lugs or flanges 21 opposite the main portion 7 of the shank and placing the serrated inner edges of the dogs adjacent, so that they will properly grip the work. By turning the screw 16 the jaws may be moved toward and from each other to engage and disengage the work.

By means of this device the dog, being clamped to the face-plate, may be adjusted to hold work of any kind, and when it is desired to change the work in the lathe this may readily be effected by manipulating the screw 16 and without employing a different form of dog to suit the new work.

Having thus described my invention, I claim as new and desire to secure by Letters Patent—

1. A lathe-dog, having a shank or stock formed with a main portion having two transverse passages, and a tail with a longitudinal slot therein, a feed-screw mounted to turn in one of the passages of the stock and having right and left hand threads, a guide-bar fastened in the other passage of the stock, and two jaws each having a jaw proper, and a flange formed with openings respectively receiving the feed-screw and guide-bar, certain of said openings being threaded to work with the feed-screw, and the jaws having portions extended toward each other at one side of the stock, the lugs of the jaws lying respectively at the edges of the stock.

2. A lathe-dog having a stock formed with two transverse passages therein, a feed-screw mounted to turn in one of the passages and having right and left hand threads at the end portions thereof, a guide-bar secured in the other passage of the shank and projecting beyond each side edge thereof, and jaws each comprising a jaw proper and a lug, the lugs receiving the feed-screw and guide-bar and being threaded to work with the feed-screw, the jaws proper extending toward each other at one side of the stock and the stock being received between the lugs.

WILLIAM BENEDICK HANKINS.

Witnesses:
B. L. MCELROY,
HARRY J. SHIPLEY.